(12) United States Patent
Elmore et al.

(10) Patent No.: US 9,122,749 B2
(45) Date of Patent: Sep. 1, 2015

(54) INTERNET BASED SYSTEM AND METHOD FOR WAGERING ON AN ARTIST

(75) Inventors: John Elmore, Atlanta, GA (US);
Duncan Freeman, Atlanta, GA (US)

(73) Assignee: Popular Metrics, Inc., Atlanta, GA (US)

(*) Notice: Subject to any disclaimer, the term of this patent is extended or adjusted under 35 U.S.C. 154(b) by 79 days.

(21) Appl. No.: 12/927,030

(22) Filed: Nov. 5, 2010

(65) Prior Publication Data

US 2011/0055223 A1    Mar. 3, 2011

Related U.S. Application Data

(63) Continuation-in-part of application No. 12/322,625, filed on Feb. 4, 2009.

(51) Int. Cl.
*G06F 7/00* (2006.01)
*G07F 17/32* (2006.01)
*G06F 17/30* (2006.01)

(52) U.S. Cl.
CPC .......... *G06F 17/30702* (2013.01); *G07F 17/32* (2013.01); *G07F 17/3244* (2013.01); *G07F 17/3288* (2013.01)

(58) Field of Classification Search
CPC .............. G06F 17/30702; G07F 17/32; G07F 17/3244; G07F 17/3288
USPC ....................... 715/716; 463/42; 707/732, 748
See application file for complete search history.

(56) References Cited

U.S. PATENT DOCUMENTS

| | | | |
|---|---|---|---|
| 6,117,011 A * | 9/2000 | Lvov | 463/25 |
| 6,241,608 B1 * | 6/2001 | Torango | 463/27 |
| 6,364,767 B1 * | 4/2002 | Brossard et al. | 463/20 |
| 7,548,915 B2 | 6/2009 | Ramer et al. | |
| 7,647,330 B2 * | 1/2010 | Rieffanaugh, Jr. | 707/803 |
| 8,005,856 B2 * | 8/2011 | Spitzer-Williams et al. | 707/769 |
| 8,015,123 B2 * | 9/2011 | Barton et al. | 705/500 |
| 8,166,029 B2 * | 4/2012 | Park et al. | 707/732 |
| 8,221,225 B2 * | 7/2012 | Laut | 463/25 |
| 8,255,488 B2 * | 8/2012 | Tanaka et al. | 709/219 |
| 8,417,713 B1 * | 4/2013 | Blair-Goldensohn et al. | 707/751 |
| 2004/0153389 A1 * | 8/2004 | Lortscher, Jr. | 705/36 |
| 2005/0003878 A1 * | 1/2005 | Updike | 463/16 |
| 2005/0075164 A1 * | 4/2005 | Krynicky | 463/25 |
| 2006/0031483 A1 | 2/2006 | Lund et al. | |
| 2006/0063580 A1 * | 3/2006 | Nguyen et al. | 463/16 |
| 2006/0211465 A1 * | 9/2006 | Moshal | 463/16 |
| 2007/0016599 A1 | 1/2007 | Plastina et al. | |
| 2007/0088727 A1 * | 4/2007 | Kindig | 715/716 |
| 2007/0173309 A1 * | 7/2007 | Rigsby | 463/16 |
| 2008/0040235 A1 * | 2/2008 | Avedissian | 705/26 |
| 2008/0062318 A1 * | 3/2008 | Ellis et al. | 348/564 |

(Continued)

OTHER PUBLICATIONS

Elmore, John Edward; Non-Final Office Action for U.S. Appl. No. 12/322,625, filed Feb. 4, 2009, mailed Aug. 4, 2011, 15 pgs.
Elmore, John Edward; Final Office Action for U.S. Appl. No. 12/322,625, filed Feb. 4, 2009, mailed Mar. 13, 2014, 27 pgs.
Elmore, John Edward; Final Office Action for U.S. Appl. No. 12/322,625, filed Feb. 4, 2009, mailed May 9, 2012, 17 pgs.

(Continued)

*Primary Examiner* — Phuong Thao Cao
(74) *Attorney, Agent, or Firm* — Taylor English Duma, LLP

(57) ABSTRACT

This invention relates generally to the field of applications for Internet based websites. Moreover, it pertains specifically to a system and method for wagering on an artist. In the preferred embodiment, system participants use an electronic exchange to place wagers related to the popularity profile of an artist.

8 Claims, 3 Drawing Sheets

(56) References Cited

U.S. PATENT DOCUMENTS

| | | | |
|---|---|---|---|
| 2008/0076504 A1* | 3/2008 | Jenkins | 463/16 |
| 2008/0182563 A1* | 7/2008 | Wugofski et al. | 455/414.2 |
| 2008/0228511 A1* | 9/2008 | Barden | 705/1 |
| 2008/0257134 A1 | 10/2008 | Oppenheimer | |
| 2008/0288326 A1* | 11/2008 | Abramowicz | 705/10 |
| 2009/0117969 A1* | 5/2009 | Englman | 463/20 |
| 2009/0182725 A1 | 7/2009 | Govani et al. | |
| 2009/0186679 A1* | 7/2009 | Irvine et al. | 463/16 |
| 2009/0325715 A1* | 12/2009 | Kelly et al. | 463/42 |
| 2010/0041482 A1* | 2/2010 | Kumar et al. | 463/42 |
| 2010/0048302 A1* | 2/2010 | Lutnick et al. | 463/42 |
| 2010/0121857 A1* | 5/2010 | Elmore et al. | 707/748 |
| 2010/0198584 A1* | 8/2010 | Habu et al. | 704/9 |
| 2010/0203938 A1* | 8/2010 | Alderucci et al. | 463/11 |
| 2010/0241723 A1* | 9/2010 | Dornbush | 709/207 |
| 2011/0045911 A1* | 2/2011 | Parham | 463/42 |
| 2011/0055223 A1* | 3/2011 | Elmore et al. | 707/748 |
| 2011/0077075 A1* | 3/2011 | Aaron | 463/26 |
| 2011/0256925 A1* | 10/2011 | Schipani et al. | 463/28 |
| 2011/0295577 A1 | 12/2011 | Ramachandran | |
| 2012/0058813 A1* | 3/2012 | Amaitis et al. | 463/25 |
| 2013/0090157 A1* | 4/2013 | Tharp | 463/25 |
| 2013/0116032 A1* | 5/2013 | Lutnick | 463/17 |

OTHER PUBLICATIONS

Elmore, John Edward; Non-Final Office Action for U.S. Appl. No. 12/322,625, filed Feb. 4, 2009, mailed May 15, 2013, 17 pgs.

Elmore, John Edward; Non-Final Office Action for U.S. Appl. No. 12/322,625, filed Feb. 4, 2009, mailed Jul. 2, 2014, 31 pgs.

Elmore, John Edward; Non-Final Office Action for U.S. Appl. No. 12/322,625, filed Feb. 4, 2009, mailed Sep. 23, 2014, 31 pgs.

Elmore, John Edward; U.S. Patent Application entitled: Internet Based Method and System for Ranking Artists Using a Popularity Porfile, having serial U.S. Appl. No. 12/322,625, filed Feb. 4, 2009, 46 pgs.

Elmore, John; U.S. Patent Application entitled: System and Method for Determining Audience Characteristics of a Music Concert Based on Mobile Phone Tracking and Mobile Data Transmission, having serial U.S. Appl. No. 13/694,804, filed Jan. 9, 2013, 26 pgs.

Elmore, John Edward; U.S. Provisional Application entitled: Internet Based Method and System for Ranking Artists Using a Popularity Profile, having serial U.S. Appl. No. 61/065,284, filed Feb. 11, 2008, 29 pgs.

Elmore, John; Non-Final Office Action for U.S. Appl. No. 13/694,804, filed Jan. 19, 2013, mailed Apr. 10, 2015, 10 pgs.

* cited by examiner

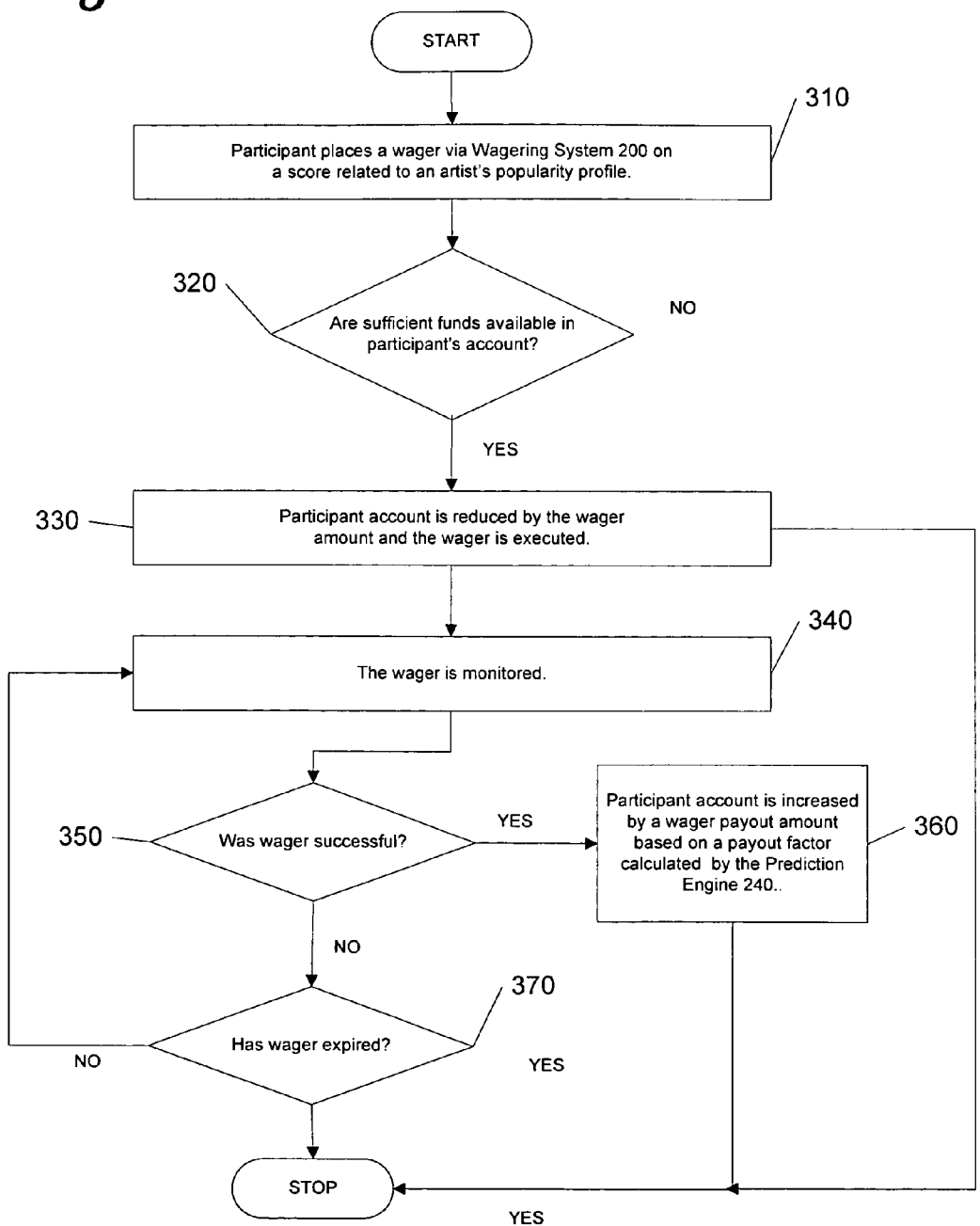

INTERNET BASED SYSTEM AND METHOD FOR WAGERING ON AN ARTIST

CROSS-REFERENCES TO RELATED APPLICATIONS

This application is a continuation-in-part of U.S. patent application Ser. No. 12/322,625, entitled "INTERNET BASED METHOD AND SYSTEM FOR RANKING ARTISTS USING A POPULARITY PROFILE," filed Feb. 4, 2009, which claims priority from provisional U.S. Patent Application No. 61/065,284, entitled "INTERNET BASED METHOD AND SYSTEM FOR RANKING ARTISTS USING A POPULARITY PROFILE," filed Feb. 11, 2008, which are incorporated herein by reference.

BACKGROUND OF THE INVENTION

1. Field of the Invention

This invention relates generally to the field of applications for Internet based websites. Moreover, it pertains specifically to a system and method for wagering on an artist. In the preferred embodiment, system participants use an electronic exchange to place wagers related to the popularity profile of an artist.

2. Description of Related Art

Existing Internet based wagering systems typically provide tools to facilitate a wager made between two or more parties, while providing little or no guidance as to the wager amount or the terms of the wager, except where the odds of a wager are predetermined and otherwise easily calculated (e.g. betting games such as poker and craps). There is a lack of innovation in the related art regarding the automated determination of a wager amount or the payout of a wager for events related to artists and their created content.

Existing systems that facilitate the wagering associated with an artist or an artist's created content generally rely on predetermined heuristics and the characteristics from prior or pending wagers to determine wager payouts. As with other systems, the wager payouts associated with such wagering suffer from significant inefficiencies where the volume of wagers or the quality and variety of information about the object of the wagers are insufficient to effectively determine a wager payout amount. As such, it is an object of the present invention to provide an Internet based system and method that overcomes these deficiencies by relying in part on a popularity profile of an artist to determine in an automated manner a more optimal payout of a wager.

SUMMARY

In view of the limitations now present in the prior art, the present invention provides a new and useful Internet based system and method for wagering on an artist, which is simpler in use, more universally functional and more versatile in operation than known applications of this kind. It is also a purpose of the present invention to provide a new Internet based system and method for wagering on an artist which has many novel features not offered by the prior art applications that result in a new Internet based system and method for wagering on an artist which is not apparent, obvious, or suggested, either directly or indirectly by any of the prior art applications.

Artists may include musicians, writers and book authors, filmmakers, graphic artists and painters, actors, entertainers and other creators of art and media content. While the preferred embodiment focuses on music artists, it is to be understood that the present invention may embody artists of other content and, as such, references to music described herein may be substituted with other created content.

The goal of present invention disclosed herein, otherwise referred to as "The Wagering System," is to provide an electronic exchange whereby a participant can make a wager based on one or more metrics related to an artist or an artist's popularity profile. A wager refers to a bet on a future outcome of a metric related to an artist. The outcome of a wager in the Wagering System is determined by the value of a metric or plurality of metrics related to an artist at a future date. This metric or plurality of metrics is based, at least in a part, on data related to an artist's popularity profile provided by a Popularity Profiling System as described in U.S. patent application Ser. No. 12/322,625. Such data may include a score or set of scores. An example of a metric related to a popularity profile is a score and the success of a wager on that metric would depend on the outcome of the score at a future time.

In one embodiment, a wager may be made by a participant at no cost and the participant risks no currency while earning points or other virtual currency if the wager is won. In the preferred embodiment, a wager consists of some amount of virtual currency that is placed at risk of loss by the participant if the actual outcome of the metric or plurality of metrics does not match the outcome expected by the wager. If the actual and expected outcomes match, or the wager is otherwise deemed successful, the participant who placed the wager earns points or other virtual currency.

In the preferred embodiment, The Wagering System provides the capability to incorporate widgets and badges on participants' and artists' websites (including their MySpace page, Facebook page and the like), allowing them to interact with the Wagering System and/or display their winnings, and/or other measures of performance related to the Wagering System. A participant can make a wager using a widget such as an iPhone application, an Android operating system based application, or another rich Internet application. Also, a participant can display the participant's wager winnings and/or other measures of performance through a widget.

In the preferred embodiment, the present invention also embodies a system and method for conducting and hosting a variety of Internet based contests through a website or a widget that will allow participants to compete against each other with respect to the amount of their virtual currency or the status of wager, goal, rank, vote, popularity metric or other type of metric using the present invention disclosed herein as the Wagering System.

In the preferred embodiment, the present invention further embodies a system and method for maintaining and displaying a list of participants via a website or a widget that will show participants in ranked order or categorize participants into groups using in one or more metrics related to virtual currency, wagering, and voting.

BRIEF DESCRIPTION OF DRAWINGS

FIG. 3 is a diagram of the process for placing and evaluating a wager.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
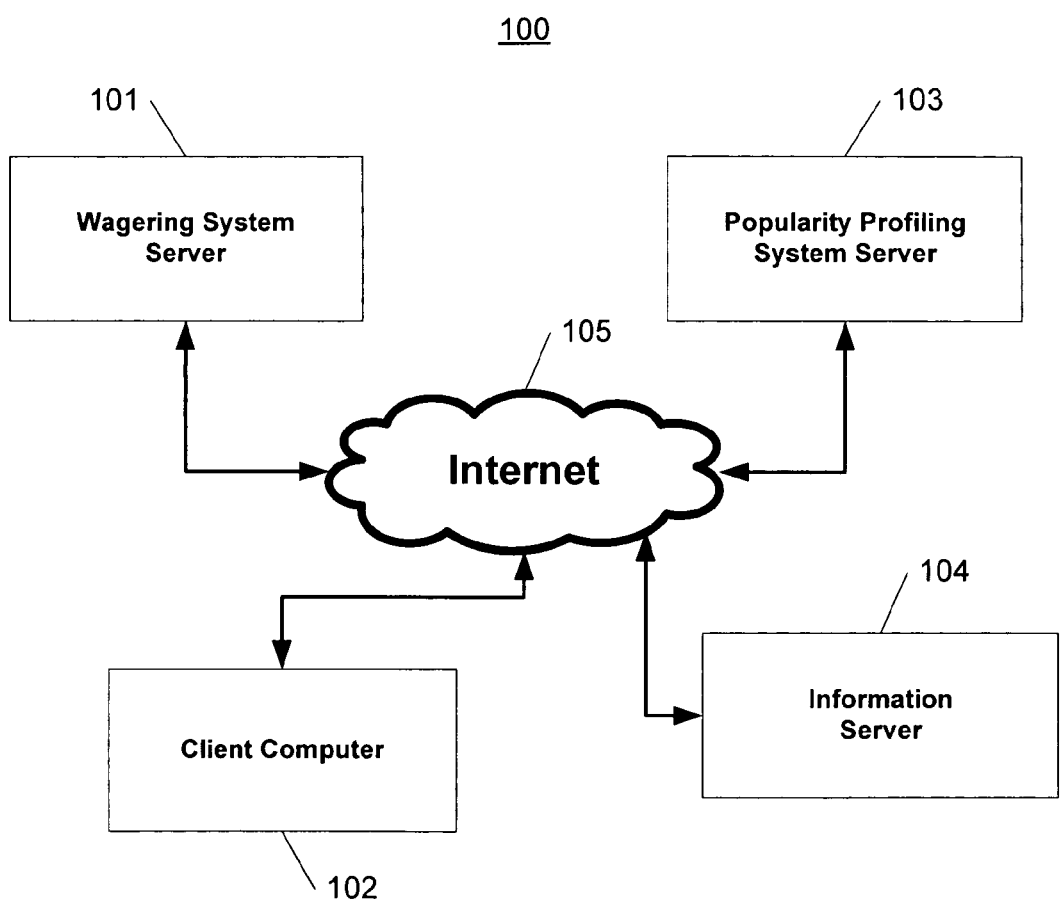
FIG. 1 is a diagram illustrating the server/client network relationship of the Wagering System server, Popularity Profiling System server, information server(s) and client(s).

FIG. 1 illustrates a computing environment in which preferred embodiments are implemented. The computing environment 100 includes at least the Wagering System server 101, at least one client computer 102, the Popularity Profiling System (PPS) Server 103, and, optionally, one or more information servers represented by 103, wherein systems 101, 102, 103 and 104 communicate over the Internet 105 and each operate on separate distinct physical computers (they share no computing resources) associated with a unique IP address. The Computer software operating within this environment 100 may employ software and methods of application, including various pieces of computer code, including, but not limited to XML, JSON, SOAP, PHP, Java, Javascript, Flash, DHTML, HTML, RSS, VML, Perl, Python, Scala, Objective-C, C# and C/C++.

All systems 101, 102, 103 and 104 communicate using a document transfer protocol such as Hypertext Transfer Protocol, (HTTP) or any other document transfer protocol known in the art, such as FTP, Gopher, WAIS, XMLP, etc. The client computer 102 may include a browser program, such as an HTML browser, capable of submitting requests using the HTTP protocol in a manner known in the art. In the preferred embodiment, if the client 102 requests the uniform resource locator (URL) for the Wagering System Server 101, then the Wagering System Server 101 would return an HTML page, or any other document based on protocols known in the art, in which the user at the client may utilize within a web browser. Alternatively, the client 102 may include software capable of rendering a graphical user interface based program such as a rich Internet application (RIA) that interacts with the Wagering System Server 101, whether directly or through another application. RIAs include applications written using HTML5, AJAX, JavaFX, Microsoft Silverlight, Abode Flex, and Adode AIR. It is understood that RIAs and web browsers may operate on personal computers and well as mobile computers and smart phones, including the iPhone and devices incorporating Google's Android operating system.

Figure 2:
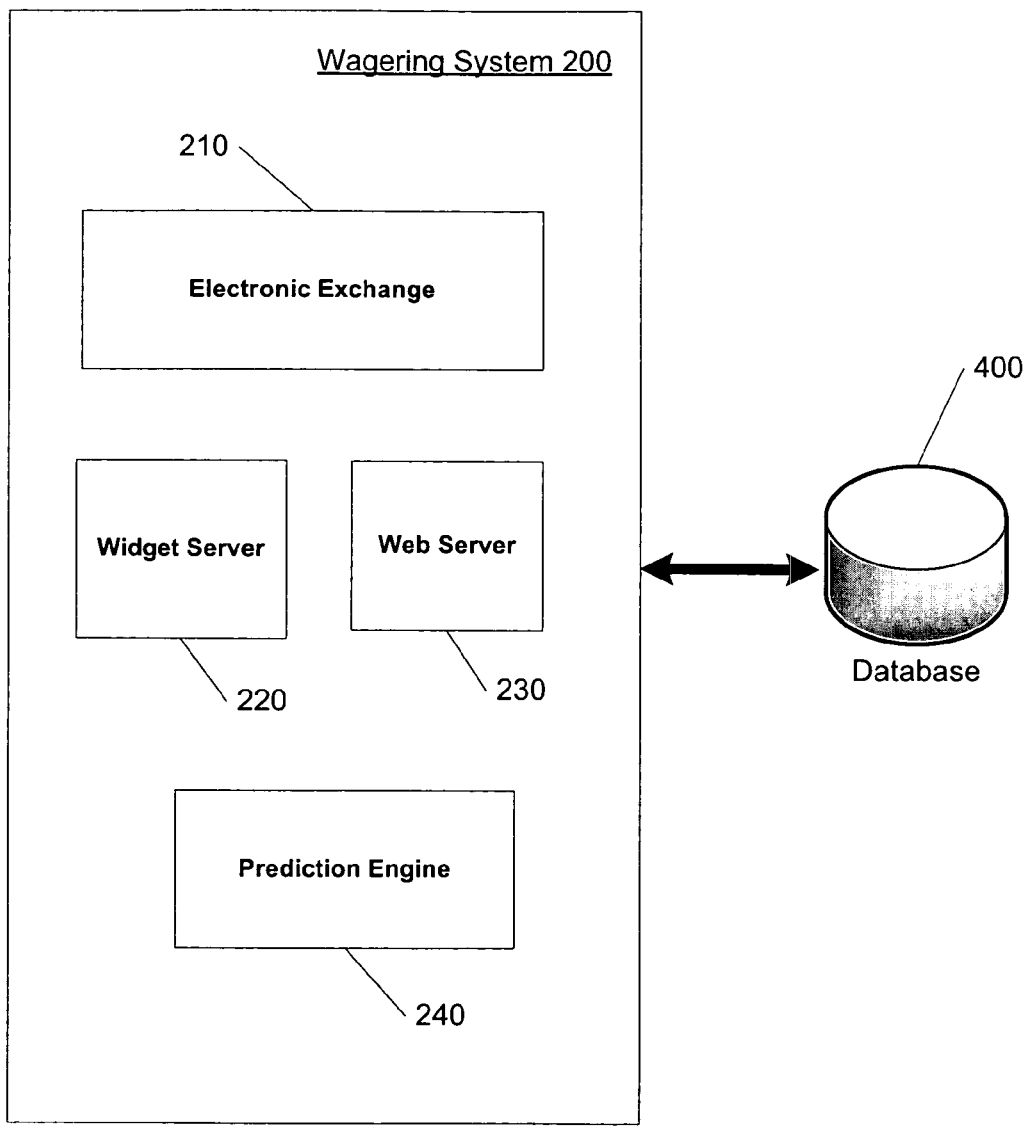
FIG. 2 is a diagram of the Wagering System in the preferred embodiment.

FIG. 2 illustrates the Wagering System 200. The Wagering System 200 includes at least an Electronic Exchange 210 and, in the preferred embodiment, includes a Widget Server 220, a Web Server 230, and a Prediction Engine 240. In other embodiments, the Wagering System 200 may not include a Widget Server 220 if no widgets will be utilized by client computers 102, or it may not include a Web Server 230 if no web browsers will be utilized by client computers 102. The Web Server 230 may be represented by one or more web servers locally attached to the Electronic Exchange 210, including being incorporated into the same server, and/or one or more web servers located remotely that utilize the Electronic Exchange 210, whether accessed directly or through intermediary computers. Likewise, the Widget Server 220 may be represented by one or more widget servers locally attached to the Electronic Exchange 210, including being incorporated into the same server, and/or one or more widget servers located remotely that utilize the Electronic Exchange 210, whether accessed directly or through intermediary computers. The Database 400 may be a dedicated database for the Wagering System 200 and the Prediction Engine 240 or one shared with other applications. The Wagering System 200 may be used with or without the Prediction Engine 240. In the preferred embodiment, the Wagering System includes the Prediction Engine 240.

1. Electronic Exchange 210

The Electronic Exchange 210 processes wagers on behalf of participants of the Wagering System 200. In the preferred embodiment, the Electronic Exchange 210 allows a participant to make a wager to predict the future outcome of one or more metrics related to an artist. The metric or plurality of metrics include at least one metric that is a part of, or based upon, an artist's popularity profile provided by a Popularity Profiling System as discussed in U.S. patent application Ser. No. 12/322,625.

In the preferred embodiment, the popularity profile of an artist includes one or more scores. Examples of the one or more scores, or their equivalents, include, but are not limited to, Fan Score (based on the number of fans of the artist), Play Score (based on number of plays and downloads of songs for the artist), Conversation Score (based on the number of comments, reviews and blog posts related to the artist), Radio Score (based on number of broadcast and online radio song plays of the artist), Concert Score (based on the number and type of upcoming shows for the artist, ticket sales of pending shows, and the attendance at prior shows), Social Score (based on number of people who recommend the artist or list the artist as a favorite), Music Sales Score (based on online and retail store sales of music related to the artist), Video Score (based on number of video plays related to the artist), Sentiment Score (based on sentiments expressed by consumers, fans and critics toward the artist), Hotness Score (based on the market momentum of the artist) and Brand Score (an aggregate score based on the above scores).

In the preferred embodiment, the Electronic Exchange 210 processes transactions using a virtual currency. A virtual currency may be defined as dollars, credits, tokens, points, badges or similar terms representative of value or ranking. The Electronic Exchange 210 maintains or accesses an account holding an amount of a virtual currency for each participant in the Wagering System 200. The Electronic Exchange 210 will debit and credit a participant's account with respect to transactions involving the participant.

In the preferred embodiment, a wager refers to a bet on a future outcome of a metric or plurality of metrics related to an artist, as noted above. A wager will include at least two components: (1) an expiration date and time, and (2) an event predicted to occur by or at the expiration date and time. An event may include, but is not limited to: an artist's score or other popularity metric reaching a threshold value, an artist's score or other popularity metric rising or falling by a threshold value, an artist being signed or fired by a record label, an artist's song reaching a measure of success, and an artist earning a career achievement or award. An event may be further defined by music genre, consumer demographic, and/or geographic region.

In the preferred embodiment, an wager is requested by a participant using a client computer 102 and transmitted to the Electronic Exchange 210 via the Web Server 230 or the Widget Server 220. Unless the wager is conditional, it is executed upon receipt by the Electronic Exchange 210. A conditional wager will not be executed until the occurrence of a conditional event (such as an artist being nominated for a Grammy award), and until it is executed, it will have no effect. An executed wager is considered open until it is fulfilled or it expires. A wager is fulfilled when the outcome of the event that is the object of the wager has been determined. A fulfilled wager is either won or lost from the perspective of the participant. For a lost wager, the participant loses the amount wagered. For a won wager, the participant wins the wager payout amount as determined by the Electronic Exchange 210, and such amount is debited to the participant's account.

A wager expires if the expiration date and time is reached prior to the determination of the outcome of the event that is the object of the wager. In the preferred embodiment, an expired wager is treated the same as a lost wager.

In the preferred embodiment, a wager payout amount is determined by the Electronic Exchange 210 based at least in part on data obtained from the PPS Server 103. The PPS Server 103 maintains a popularity profile for a plurality of artists, wherein the PPS Server 103 has the capability to list a metric or plurality of metrics, such as a score or set of scores, related to the popularity profile of each artist in a numerical order. An example of a metric is the Brand Score of an artist, wherein artists are listed in descending order of the value of the Brand Score. A distribution is formed from a list by segmenting the list into groups, wherein a group is defined as a range of values. The distribution allows the Electronic Exchange 210 to determine the percentage of artists within a population of artists that exhibit a metric of which the value falls within a group (e.g. 5% of artists exhibit a Brand Score greater than 500). A payout factor is then determined from the distribution of the probabilities that a future value of the metric will equal or exceed the wagered outcome (or in cases where the metric is expected to decrease, the wagered outcome will equal or exceed the future value). By way of example in the preferred embodiment, the payout amount (in the form of a virtual currency) earned for a wager is represented as follows:

$$P_t = \begin{cases} A\lambda - A & \text{if } S_t \geq \dot{S}, \\ -A & \text{if } S_t < \dot{S}, \end{cases}$$

where P is the points earned (lost), $S_t$ is the future value of a metric (such as a score) at time t, $\dot{S}$ is the wagered outcome, $\lambda$ is the payout factor, and A is the amount wagered.

In the situation where a wager is placed on a quantitative metric encapsulated in an artist's popularity profile or otherwise measured by the PPS (e.g. a wager that an artist's Brand Score will reach 400), Electronic Exchange 210 determines the wager payout amount based on the probability that the initial value of a metric at the time the wager was executed will change to the wagered outcome (the outcome which must be achieved in order to win the wager) before the wager expires. This probability is calculated by the Electronic Exchange 210, at least in part, as a function of the percentage of artists exhibiting the metric at the initial value, the percentage of artists exhibiting the metric at the wagered outcome, the momentum of the metric (as measured by the PPS), the duration of the wager period (the time before expiration), and wagers placed by other participants in the Wagering System 200 for the same or related metric. In the situation where a wager is placed on a qualitative metric (e.g. a wager that an artist will win a Grammy award), the probability is calculated from a quantified metric or plurality of metrics encapsulated in an artist's popularity profile, or otherwise measured by the PPS, that best serves as an indicator for the qualitative metric that is the basis of the wager.

2. Widget Server 220

The Widget Server 220 acts as an interface between the Wagering System 200 and any applications operating on a client computer 102 that provide or receive data to or from the Wagering System 200. An example of a widget is an application that runs on an iPhone and allows the iPhone operator to place wagers through the Wagering System 200. The Widget Server 220 may provide or receive data using an application programming interface (API), web services, file exchange, or other techniques known in the art. In the preferred embodiment, data is exchanged between the Widget Server 220 and the client computer 102 in a structured format which conforms to a protocol such as XML or JSON.

In the preferred embodiment, the Widget Server 220 maintains a list of uniform resource locators (URLs) associated with client computers 102 that host the widgets. The Widget Server 220 pushes data or commands to the widgets operating on the client computers 102 according to configuration settings for each widget that indicates what data is to be pushed and the time or frequency to push it. Further, widgets can relay information to the Widget Server 220 based on a user request or via an automated process, such as a notification of status, an event occurrence or an alert. Generally, active widgets listen for commands or data sent from the Widget Server 220, and the Widget Server 220 listens for requests from widgets.

3. Web Server 230

The Web Server 230 acts an interface between the Trading System 200 and any browser applications operating on a client computer 102. It generates one or more web pages which may utilize data from the Database 400. A typical web page is a document composed in languages, protocols and formats including, but not limited to, HTML, DHTML, Java, Javascript, JSP, ASP, PHP, Python, Perl, Ruby, Scala, Erlang, C#, C/C++, JSON and XML; it may be implemented with other computer protocols, languages, and techniques known in the art. A web user may register on the website, providing personal and/or login information, in order to procure a website based user account and gain access to restricted web pages and/or features. The Web Server 230 may also exchange data and documents with the Widget Server 220 for use with widgets and $3^{rd}$ party applications.

In the preferred embodiment, a client computer 102 requests a web page from the Web Server 230 via a web browser. At least one web page is presented to a participant that provides the current status and outcome of the one or more wagers and/or trades of shares made by the participant. Also in the preferred embodiment, a web page may be presented that lists participants in order of performance as measured by one or more metrics including, but not limited to, the amount of currency in a participant's account, the amount of currency gained or lost in one or more wagers, and the number or percentage of favorable or unfavorable wagers made by a participant.

4. Database 400

The Database 400 stores information utilized by the Wagering System 200. One of ordinary skill in the art will appreciate that the Database 400 can be implemented using a variety of open source and commercial products and tools.

5. Prediction Engine 240

The Prediction Engine 240 performs data analysis and makes predictions about artists based on data provided by the Wagering System 200 and the Popularity Profiling System Server 103. Other data may also be utilized. A prediction may include the future performance or popularity of an artist or an artist's content as measured by wagers, music sales, online plays, scores, or other metrics reflected in data obtained from the Wagering System 200 and the Popularity Profiling System Server 103.

In the preferred embodiment, the Prediction Engine 240 estimates the future value of a metric, such as a score as part of the popularity profile of an artist, based at least in part on wagers placed by participants of the Wagering System 200.

In the preferred embodiment, the Prediction Engine 240 makes a prediction of a future value based on a metric or plurality of metrics, such as a criterion, set of criteria, score or set of scores associated with an artist's popularity profile as determined by a PPS operating on Popularity Profiling System Server 103. Examples of a metric include music sales, song downloads and plays, attendance at concerts, a popularity score, and other measures of popularity and music demand. The prediction is a function of at least the amounts of the wagers, the wager payouts, the duration of the wagers (the difference between the time of execution and either expiration or fulfillment), the wagered outcomes, the actual outcomes, and the historical win/loss record of the participants. The Prediction Engine 240 will make one or multiple predictions for each metric. For multiple predictions, the Prediction Engine 240 calculates a probability distribution for the set of predictions related to a metric, wherein each prediction in the set is assigned a probability (0% to 100%) or similar indicator that the prediction will be correct (i.e. a confidence level). The Prediction Engine 240 further calculates a margin of error for each prediction to indicate its expected accuracy. Further, for some metrics such as scores, a prediction function incorporates a trend analysis of an artist's historical scores and/or other metrics associated with a popularity profile. This is illustrated by the following examples:

$$\dot{S}_{t+1} = \mathcal{F}(S_{1\ldots t}), \tag{1}$$

$$\dot{S}_{t+1} = \mathcal{F}(S_{1\ldots t}, M_{1\ldots n, 1\ldots t}), \tag{2}$$

$$\dot{S}_{t+1} = \mathcal{F}(S_{1\ldots t}, M_{1\ldots n, 1\ldots t}, W_{1\ldots n, 1\ldots t}), \text{ and} \tag{3}$$

$$\dot{S}_{t+1} = \mathcal{F}(S_{1\ldots t}, M_{1\ldots n, 1\ldots t}, W_{1\ldots n, 1\ldots t}, \dot{S}_{1\ldots t}), \text{ and} \tag{4}$$

$$\dot{S}_{t+1} = \mathcal{F}(S_{1\ldots t}, M_{1\ldots n, 1\ldots t}, W_{1\ldots n, 1\ldots t}, \dot{S}_{1\ldots t}, E_{1\ldots t}), \text{ and} \tag{5}$$

where $\dot{S}_{t+1}$ is the predicted value of a score (e.g. brand strength) at time t+1, $S_{1\ldots t}$ is the set of historical values of the score S for a prior period of time incrementally defined in units 1 through t, $M_{1\ldots n, 1\ldots t}$ is a set of n different historical metrics (which may include retrieved data or other scores) for the prior period, $W_{1\ldots n, 1\ldots t}$ is a set of n different wagers related to the score for the prior period, $\dot{S}_{1\ldots t}$ is a set of prior predictions of the score S, if any, made by the Prediction Engine 240 for the prior period, and $E_{1\ldots t}$ is a set of error values (e.g. $\dot{S}_1-S_1, \dot{S}_2-S_2, \ldots, \dot{S}_i-S_i, \ldots, \dot{S}_t-S_t$) for the prior period. The function $\mathcal{F}()$ may be defined as a mathematical operation (or set of operations) on the inputs (which may include $S_{1\ldots t}$, $M_{1\ldots n, 1\ldots t}$, $W_{1\ldots n, 1\ldots t}$, $\dot{S}_{1\ldots t}$, and $E_{1\ldots t}$). By way of example, $\mathcal{F}()$ could represent a trend estimation technique such as the least squares method, weighted least squares method, or other method of linear regression. As another example, $\mathcal{F}()$ could represent a pattern recognition technique such as a neural network or a hidden Markov model.

Also in the preferred embodiment, the Wagering System 200 and other components described herein are used as part of an Internet based game. In one version of the game, a player assumes the role of a music professional (e.g. a music "scout" in the game MusicScout.com) with the goal of predicting which artists and/or songs will be successful. A player earns points or other virtual currency via a wager payout by making accurate predictions. Success of an artist or an artist's content is gauged at least in part by an artist's popularity profile as determined by the PPS. It may also be gauged by the results of wagers conducted via the Wagering System 200. It may be further gauged by results from the Prediction Engine 240.

FIG. 3 illustrates wager process 300 via the Wagering System 200 in the preferred embodiment. In the first step 310, a participant places a wager regarding a score related an artist's popularity profile as determined by the PPS operating on the Popularity Profiling System Server 103. The wager payout may be calculated prior to or after a wager is placed. Following step 310, the Wagering System 200 checks to see whether sufficient funds are available in the participant's account. If so, the amount of the wager is deducted from the account in step 330 and the wager is executed. The wager is then monitored at step 340, periodically checking the outcome of the metric that is the subject of the wager until the expiration or fulfillment of the wager. The wager is evaluated to determine if it was successful at step 340. (A wager may be evaluated prior to expiration, for example, if its success if based on the mere passing of a threshold value at some point in time regardless of its value at expiration.) If the wager was successful, the participant's account is increased by the wager payout amount at step 360. If not successful, the wager is evaluated to determine if it has expired at step 370.

OBJECTS OF THE INVENTION

Accordingly several advantages and objects of the present invention include but are not limited to:

A principal object of the present invention is to provide a Wagering System and Method that will overcome the deficiencies of the prior art devices.

An object of the present invention is to provide a Wagering System and Method that will provide a means for participants to make wagers, trades and/or predictions related to one or more measures of the popularity and performance of an artist or an artist's content, such as the measures associated with an artist's popularity profile.

Another object of the present invention is to provide a Wagering System and Method that will predict which bands, musicians and artists will likely become commercially successful, or which exhibit a high potential for commercial success, based at least in part on the wagers placed via the Wagering System related to the artists or the artists' music.

Another object of the present invention is to provide a Wagering System and Method which is incorporated into an Internet based game.

Another object of the present invention is to provide a Wagering System and Method which has mobile ability, including being accessible through mobile phones, PDAs and other mobile Internet based devices such as the iPhone.

Another object of the present invention is to provide a Wagering System and Method which is accessible through web browsers, widgets and RIAs.

It is intended that any other advantages and objects of the present invention that become apparent or obvious from the detailed description or illustrations contained herein are within the scope of the present invention.

What is claimed is:

1. A computer system for wagering on a music artist, comprising:
   one or more client computers, wherein at least one client computer is configured to send and receive data via the Internet;
   a popularity profiling system (PPS) server configured to provide metrics related to the music artist, wherein the metrics include one or more scores representing the popularity of the music artist;
   a wagering system server, comprising an electronic exchange implementing computer instructions configured to cause the wagering system server to:
   (a) obtain an initial score from the PPS server, wherein the initial score indicates a sentiment of at least one music consumer based on the PPS server applying sentiment analysis to at least one published review by the at least one music consumer of a song performed by the music artist;

(b) process a transaction request by a client computer, wherein the transaction request comprises a wager amount, a threshold value, and an expiration date and time;

(c) deduct the wager amount from the balance of an account associated with the client computer, the account being established and maintained by the wagering system server;

(d) obtain, periodically at a predetermined interval of time and prior to reaching the expiration date and time, one or more subsequent scores from the PPS server that relates to the initial score;

(e) determine, in response to obtaining each of the one or more subsequent scores, whether the difference between the subsequent score and the initial score exceeds the threshold value;

(f) if the difference between the subsequent score and the initial score exceeds the threshold value, determine an award amount based on the wager amount and add the award amount to the balance of the account associated with the client computer; and (g) if the expiration date and time is reached without determining an award amount, transmit a message to the client computer indicating that the wager was unsuccessful;

wherein the account balance, the wager amount, and the award amount are denominated in a virtual currency;

a client computer interface;

a database server for storing some or all of the data obtained and processed by the wagering system server; and one or more network interfaces connecting the wagering system server, the popularity profiling system server, the database server, the client computer interface, and the one or more client computers to the Internet, wherein the one or more network interfaces connect the client computer, a database and servers via the Internet, and wherein the client computer, the database server, the PPS server, and the wagering system server, and the client computer interface each operate on separate and distinct physical computers.

2. The computer system of claim 1, wherein the electronic exchange further implements computer instructions configured to cause the wagering system server to process a transaction requested by a client computer, wherein the transaction request relates to an order to sell one or more shares of a predetermined number of shares maintained by the electronic exchange related to an artist, wherein if a sell order is not fulfilled within a time period designated for the sell order, then the sell order is fulfilled by the electronic exchange if an offer price of the sell order equals or exceeds a bid price determined by the wagering system server that is derived from data related to the music artist obtained previously from the popularity profiling system server.

3. The computer system of claim 1, wherein the client computer interface is a web server.

4. The computer system of claim 1, wherein the client computer interface is a widget server.

5. The computer system of claim 1, wherein the metrics obtained from the popularity profiling system server is part of a popularity profile of the music artist.

6. The computer system of claim 1, wherein the wagering system server is comprised also of a prediction engine, wherein the prediction engine makes a prediction about a future outcome of the one or more scores of the metrics based on a trend estimation technique applied to a plurality of scores representing the popularity of the music artist, wherein at least a subset of the plurality of scores was obtained by the wagering system server from the PPS server on at least three different dates.

7. A computer implemented method for wagering on an artist, comprising:

obtaining an initial score related to a music artist's popularity profile from a popularity profiling system (PPS) server, wherein the initial score indicates a sentiment of at least one music consumer based on the PPS server applying sentiment analysis to at least one published review by the at least one music consumer of a song performed by the music artist;

processing, by an electronic exchange operating on a wagering system server, a transaction request by a client computer, wherein the transaction request comprises a wager amount, a threshold value, and an expiration date and time;

deducting, by the electronic exchange, the wager amount from the balance of an account associated with a client computer, the account being established and maintained by the wagering system server;

obtaining, by the electronic exchange, periodically at a predetermined interval of time and prior to reaching the expiration date and time, one or more subsequent scores from the PPS server that relates to the initial score;

determining, by the electronic exchange, in response to obtaining each of the one or more subsequent scores, whether the difference between the subsequent score and the initial score exceeds the threshold value;

if the difference between the subsequent score and the initial score exceeds the threshold value, determining, by the electronic exchange an award amount based on the wager amount and add the award amount to the balance of the account associated with the client computer; and if the expiration date and time is reached without determining an award amount, transmitting, by the electronic exchange, a message to the client computer indicating that the wager was unsuccessful;

wherein the account balance, the wager amount, and the award amount are denominated in a virtual currency.

8. The computer implemented method of claim 7, further comprising making, by the electronic exchange, a prediction of a future outcome of one or more scores of the music artist's popularity profile based on a trend estimation technique applied to a plurality of scores representing the popularity of the music artist, wherein at least a subset of the plurality of scores was obtained by the wagering system server from the PPS server on at least three different dates.

* * * * *

UNITED STATES PATENT AND TRADEMARK OFFICE
CERTIFICATE OF CORRECTION

| | | |
|---|---|---|
| PATENT NO. | : 9,122,749 B2 | |
| APPLICATION NO. | : 12/927030 | |
| DATED | : September 1, 2015 | |
| INVENTOR(S) | : Freeman et al. | |

It is certified that error appears in the above-identified patent and that said Letters Patent is hereby corrected as shown below:

Title Page

The first named inventor should read:

(12) UNITED STATES PATENT
Freeman et al.

The listing of inventors should read:

(75) Inventors: Duncan Freeman, Atlanta, GA (US);
John Elmore, Atlanta, GA (US)

The front of the patent will include the full continuity claim as noted in the first paragraph of the specification. Specifically please insert:

--Related U.S. Application Data
(63) Continuation-in-part of application No. 12/322,625, filed Feb. 4, 2009 which claims the benefit of provisional U.S. Patent Application No. 61/065,284, filed Feb. 11, 2008, and claims the benefit of provisional U.S. Patent Application No. 61/280,244, filed Nov. 2, 2009--

In the first paragraph of the specification, col. 1, the "CROSS-REFERENCE TO RELATED APPLICATION" should be edited to read:

This application is a continuation-in-part of U.S. Patent Application No. 12/322,625, entitled "INTERNET BASED METHOD AND SYSTEM FOR RANKING ARTISTS USING A POPULARITY PROFILE," filed February 4, 2009, which claims the benefit of provisional U.S. Patent Application No. 61/065,284, entitled "INTERNET BASED METHOD AND SYSTEM FOR RANKING ARTISTS USING A POPULARITY PROFILE," filed February 11, 2008, which are incorporated herein by reference, and this application claims the benefit of provisional U.S. Patent Application No. 61/280,244, entitled "INTERNET BASED SYSTEM AND METHOD FOR WAGERING ON AN ARTIST" filed November 2, 2009.

Signed and Sealed this
Twenty-second Day of March, 2016

Michelle K. Lee
*Director of the United States Patent and Trademark Office*